(12) United States Patent
Coventry (10) Patent No.: US 6,199,316 B1
(45) Date of Patent: Mar. 13, 2001

(54) APPARATUS FOR PROVIDING A SLOW RELEASE OF A COMPRESSED GAS AND AN INSECT TRAP INCORPORATING SAME

(76) Inventor: Andrew Paul Coventry, 34 Peter Thompson Drive, Parkwood, Queensland 4214 (AU)

( * ) Notice: Subject to any disclaimer, the term of this patent is extended or adjusted under 35 U.S.C. 154(b) by 0 days.

(21) Appl. No.: 09/364,357

(22) Filed: Jul. 30, 1999

(30) Foreign Application Priority Data

Nov. 26, 1998 (AU) .................................................. 7358

(51) Int. Cl.[7] .................................................. A01M 1/00
(52) U.S. Cl. .......................... 43/132.1; 43/107; 239/337; 239/373; 239/589
(58) Field of Search .................................. 43/132.1, 124, 43/113, 107, 139; 239/302, 337, 373, 589

(56) References Cited

U.S. PATENT DOCUMENTS

| | | | |
|---|---|---|---|
| 2,083,950 | 6/1937 | Guba | 21/58 |
| 3,041,773 | * 7/1962 | Gagliano | 43/113 |
| 4,332,100 | * 6/1982 | Schneider | 43/113 |
| 4,506,473 | * 3/1985 | Waters, Jr. | 43/107 |
| 4,907,366 | * 3/1990 | Balfour | 43/132.1 |
| 5,301,456 | * 4/1994 | Joobin | 43/113 |
| 5,382,422 | 1/1995 | Dieguez et al. | |
| 5,813,166 | * 9/1998 | Wigton | 43/107 |

FOREIGN PATENT DOCUMENTS

| | | |
|---|---|---|
| 200591 | 4/1985 | (AU) . |
| 20441/92 | 1/1993 | (AU) . |
| 11632/95 | 8/1995 | (AU) . |

\* cited by examiner

*Primary Examiner*—Jack W. Lavinder
(74) *Attorney, Agent, or Firm*—Workman, Nydegger & Seeley (57) ABSTRACT

An apparatus 10 for providing a continuous slow release of compressed gas includes a pressure vessel 12 and a restrictor tube 16. The restrictor tube 16 has a first open end 18 located inside the pressure vessel 12 and an opposite second open end 20 located outside the pressure vessel 12. The restrictor tube has a small diameter so as to restrict the flow of gas therethrough and out of the pressure vessel 12. Pressure vessel 12 is connected to a supply of compressed gas via a valve 28. When a volume of gas is transferred to the vessel 12 via valve 28, the gas enters the first opening 18, travels through the restrictor tube 16 and out of the second opening 20 to provide a slow continuous release of gas. In one embodiment, the pressure vessel 12 is incorporated in an insect trap 30. The trap 30 also includes a light source 48 of emitting light that attracts insects and a solution tray 44 for holding the liquid in which insects can become entrapped and drowned. The liquid may also include various chemicals that act as attractants to the insects. A fan 44 circulates air and the gas released by pressure vessel 12 through housing 32 of the insect trap 30. The circulation is in a direction so as to cause a downdraft in the vicinity of an opening 36 through the housing 32. The downdraft is directed to the selection tray 44 to assist in blowing insects into the tray 44. The gas released by the vessel 12 acts to asphyxiate the insects.

25 Claims, 7 Drawing Sheets

Page 1

APPARATUS FOR PROVIDING A SLOW RELEASE OF A COMPRESSED GAS AND AN INSECT TRAP INCORPORATING SAME

FIELD OF THE INVENTION

The present invention relates to an apparatus for providing a slow release of a compressed gas such as but not limited to, carbon dioxide, and an insect trap incorporating such apparatus.

BACKGROUND OF THE INVENTION

In some gas operated apparatuses it is required to provide a continuous flow of gas from a gas supply. Typically this involves the use of relatively expensive and complicated gas flow regulators and monitors.

SUMMARY OF THE INVENTION

The present invention was developed to provide a simple apparatus that can provide a continuous slow release of gas from an initial gas charge. While the apparatus can be used in many different applications, one recently developed application is in an insect trap.

According to a first aspect of the invention there is provided an apparatus for providing a continuous slow release of a compressed gas, the apparatus comprising at least:
  a pressure vessel adapted for connection to a supply of compressed gas for holding a volume of said compressed gas; and,
  a restrictor tube having a first open end located within the pressure vessel and an opposite second open end located outside the pressure vessel;
  whereby, in use, when a volume of gas is transferred from the supply of compressed gas to the pressure vessel, the volume of gas enters the first open end, travels through the restrictor tube and exists from the second open end to provide a continuous slow release of the volume of gas from the pressure vessel.

Preferably the apparatus further includes means for opening, from time to time, a fluid communication path between the supply of compressed gas and the pressure vessel to charge the pressure vessel with said volume of compressed gas.

Preferably said means is automatically operated to cyclically open the communication path for a predetermined first period after the expiration of a predetermined second period.

In an alternate embodiment, said means is automatically operated to open said communication path for a predetermined first period upon detecting a predetermined physical characteristic of, the gas inside the pressure vessel and/or the surrounding environment. The predetermined physical characteristic may include one or more of the following: gas pressure inside the pressure vessel; gas pressure inside the restrictor tube; gas temperature within the pressure vessel; gas temperature within the restrictor tube; a predetermined difference in gas pressure or temperature within the pressure vessel and a predetermined location within the restrictor tube; ambient light; pressure, temperature, wind speed.

According to a second aspect of the present invention there is provided an insect trap comprising at least:
  a housing defining an insect collection chamber, the housing having one or more apertures to allow an insect to enter the chamber; and,
  an apparatus for providing a continuous slow release for compressed gas in accordance with the first aspect of the present invention, with the second open end of the restrictor tube located within the insect collection chamber so that the gas is continuously and slowing released into the chamber;
  whereby, in use, an insect, upon entering the chamber through said aperture, is asphyxiated by the gas and collects in the chamber.

Preferably the trap further includes a light source for producing a light of a wavelength attractive to a range of insects desired to be trapped.

Preferably said light source includes at least two light emitting devices emitting light of different wavelength.

Preferably said light source includes a light mixer for mixing the light emitted by said light emitting devices.

Preferably said light mixer includes a transparent or translucent prism to which said light emitting devices are optically coupled.

Preferably said prism is provided with an array of surface grooves or scratches for refracting light emitted by said light emitting devices as it passes from the prism to the surrounding atmosphere.

Alternately or in addition the surface of the prism is frosted.

Preferably the insect trap includes a light source circuit for controlling the ON/OFF cycle of the light emitting devices.

Preferably the insect trap includes a body of liquid held in the chamber at a location so that an asphyxiated insect can fall into the liquid.

Preferably the liquid includes a volume of lactic acid.

Preferably the liquid further includes a volume of octenol.

Preferably said second open end of the tube is disposed below the surface level of the liquid so that the gas bubbles through the liquid to reduce its surface tension.

Preferably the gas is one of a character or nature that attracts one or a range of insects desired to be trapped.

Preferably the gas is carbon dioxide.

Preferably the insect includes air circulation means for circulating air through said housing in a direction to produce a down draught near said opening toward said body of liquid.

BRIEF DESCRIPTION OF THE DRAWINGS

Embodiments of the present invention will now be described with reference to the accompanying drawings in which:

FIG. 6b is a side view of the light source depicted in FIG. 6a;

DETAILED DESCRIPTION OF THE PREFERRED EMBODIMENTS

Figures 1, 2:
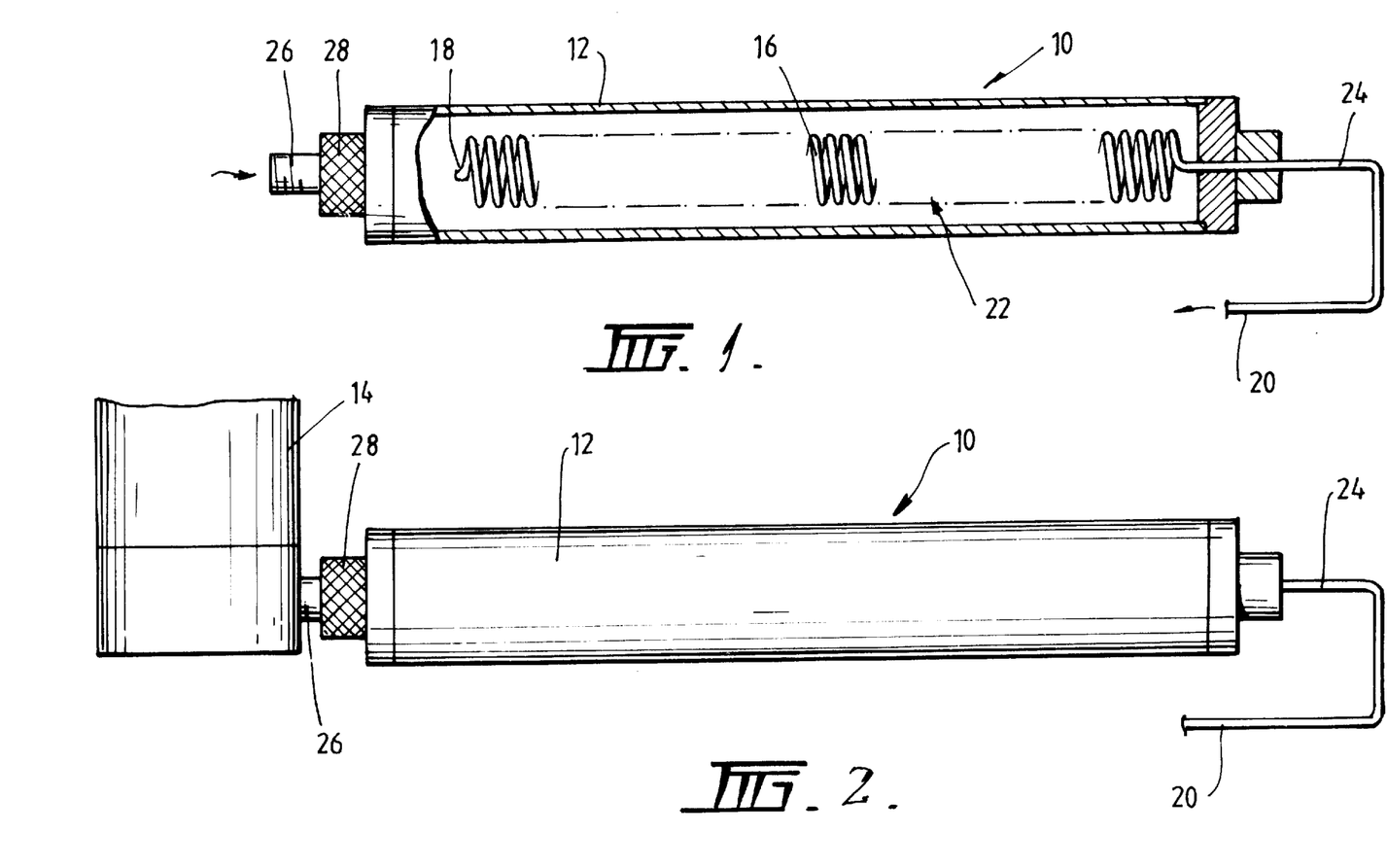
FIG. 1 is a partial section of an apparatus for the continuous slow release of a compressed gas.
FIG. 2 is a side view of the apparatus shown in FIG. 1 attached to a supply of gas.

Referring particularly to FIGS. 1 and 2, the apparatus 10 for providing a continuous slow release of a compressed gas includes a pressure vessel 12, adapted for connection to a supply of compressed gas such as a cylinder 14 of compressed gas, and a restrictor tube 16. The restrictor tube 16 has a first open end 18 located inside the pressure vessel 12 and an opposite second open end 20 located outside the pressure vessel 12. The restrictor tube 16 is made of a small diameter so as to restrict the flow of gas therethrough and out of the pressure vessel 12. Thus, in use, when a volume of gas is transferred from the cylinder 14 into the pressure vessel 12, the gas enters the first opening 18, travels through the restrictor tube 16 and out the second opening 20 to provide a slow continuous release of the gas.

The tube 16 has a first length 22 located inside the pressure vessel 12 and a second length 24 extending outside the pressure vessel 12. Typically, the first length 22 is coiled for the purpose of saving space ie minimising the length dimension of the pressure vessel 12, and also for ease of manufacture. The length and diameter of tube 16 and in particular the coiled length 22 effects the time take to discharge the gas within the pressure vessel 12. Clearly, the smaller the diameter and longer the length of the tube 16, with all other matters being equal, the longer it will take for the gas to bleed out of the pressure vessel 12. Thus, for different applications, the tube 16 can be replaced with tubes of different lengths and diameters.

A gas inlet 26 is provided at one end of the pressure vessel 12 for connection with the cylinder 14. In order to control the flow of gas from the cylinder 14 into the pressure vessel 12, means in the form of a valve 28 is provided in a fluid communication path between the cylinder 14 and the pressure vessel 12. The valve 28 can be electronically or mechanically operated. The purpose of the valve 28 is to provide a pulse of gas from the cylinder 14 to enter the vessel 12. The valve can be operated on an automatic timer so as to open for a predetermined period, say for example one tenth of a second (100 ms) approximately every thirty seconds and uses approximately 1 gram of gas at each pulse or burst. Thus about 120 grams of gas would be used every hour, that gas being continuously and slowing bleed from the pressure vessel 12 via the restrictor tube 16. It is envisaged that the opening duration of the fluid communication path between the cylinder 14 and the pressure vessel 12 can be adjusted and similarly the frequency or cycle time, ie time between pulses can also be adjusted.

As an alternate to the valve 28 being operated on a timer basis, it can include sensors to allow it to operate on the basis of some physical characteristic of the gas within the pressure vessel 12. For example, the valve 28 can operate on the basis of the gas pressure within the pressure vessel 12 or the tube 16 dropping to a predetermined level, or the gas temperature within the pressure vessel 12 or the tube 16 reaching a predetermined level, or on the basis of a predetermined pressure or temperature difference existing between the gas within the pressure vessel 12 and at a specific location within the tube 16; or the difference in pressure of gas at the first and second openings 18,20 of the tube 16. Further, as explained below, when the vessel 12 is incorporated into an insect trap, the valve 28 can also be operated or controlled on the basis of other characteristics such as ambient light, temperature, pressure or wind speed.

Embodiments of the apparatus 10 can be used to provide, from a short pulse of gas, a continuous slow release of gas. Because the gas is pulsed into the pressure vessel 12, the valve 28 is only operated for a short period of time thereby minimising power requirements. Further, as the slow release is effected by simply mechanical means, namely the restrictor tube 16, complex pressure regulators or valving and plumbing is not required.

Figure 3:
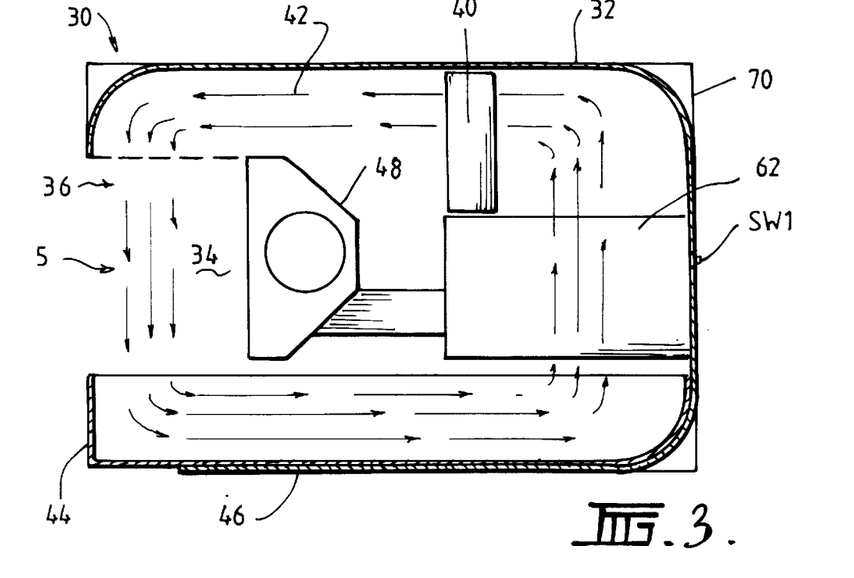
FIG. 3 is a schematic representation from the side of an insect eradication device incorporating the apparatus shown in FIGS. 1 and 2.
Figure 4:
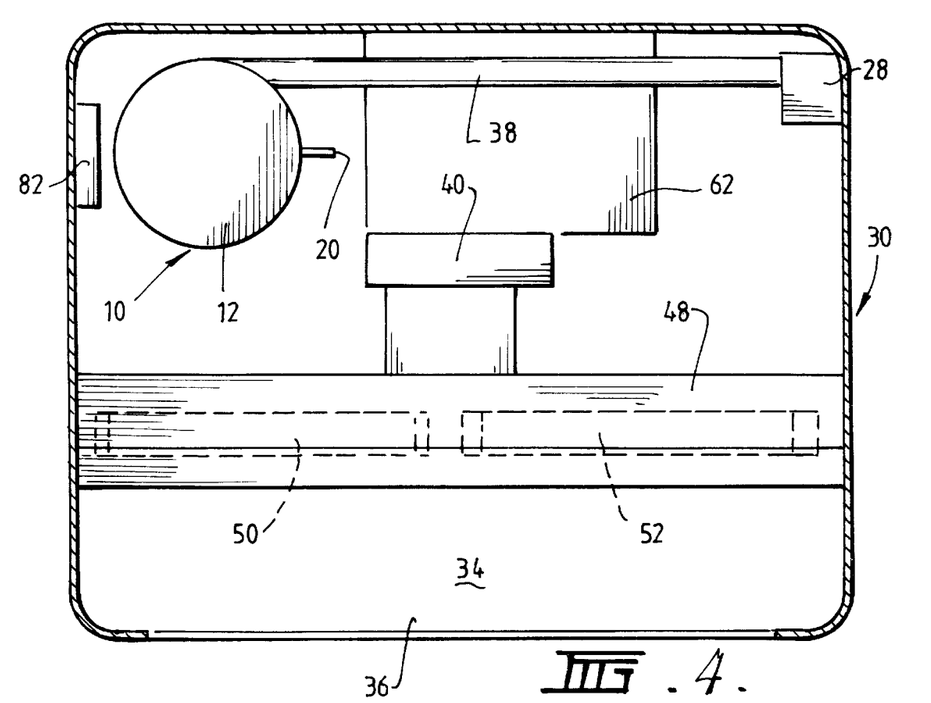
FIG. 4 is a plan view of the insect eradication device depicted in FIG. 3.
Figure 5:
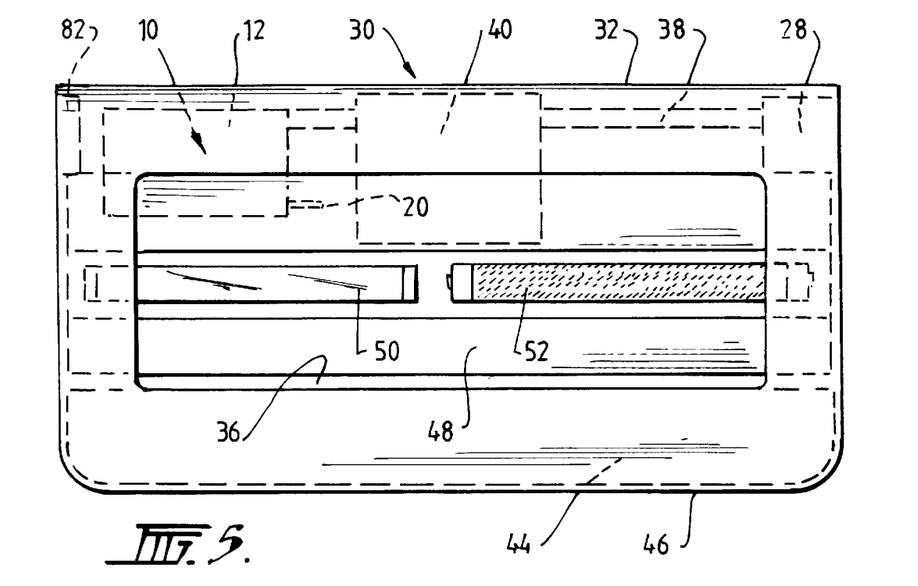
FIG. 5 is a front view of the insect eradication device depicted in FIGS. 3 and 4.

An application of the apparatus 10 is depicted in FIGS. 3–5 which illustrates an insect eradication device (hereinafter referred to more simply as an "insect trap"). The insect trap 30 includes a generally rectangular housing 32 defining an insect collection chamber 34. The housing 32 is provided with aperture or opening 36 to allow an insect to enter the chamber 34 and also to allow attractants to pass from the housing 32 to the surrounding atmosphere. In this embodiment, the apparatus 10 differs from that depicted in FIGS. 1 and 2 by forming the pressure vessel with an integral extension passage 38 that communicates with the valve 28. The apparatus 10 is supported within an upper region of the housing 32 with the second opening 20 disposed to provide a slow continuous release of gas within the chamber 34. An electric fan 40 is held within the upper region of the housing 32 adjacent the apparatus 10 for producing an air flow 42 that circulates within the housing 32 in a direction so as to produce a down draught in the chamber 34 adjacent the opening 36.

A removable solution tray 44 is supported on a lower wall 46 of the housing 32 and is positioned so that at least a forward end of the tray 44 is beneath the down draught produced by the air flow 42. The tray 44 is used to hold a body of liquid that assists in the entrapment or killing of insects entering the trap 30. In its most basic form, the liquid can be water so that insects entering the housing 32 that are asphyxiated by the gas released by the apparatus 10 fall into the water in the tray 44 and drown. Alternately insects may directly enter the tray 44 and become entrapped and drown. The entrapment of insects in tray 44 is enhanced by the down draught created by the air flow 42 which tends to blow insects into the liquid held within the tray 44.

It is envisaged that the liquid in tray 44 will include chemicals that act as an attractant to the insects desired to be caught by the trap 30. Two particular chemicals envisaged for use in attracting mosquitoes are lactic acid and octenol. Lactic acid is present in human sweat and is believed to be an attractant to mosquitoes. Octenol is another chemical that is believed to act as attractant for both mosquitoes and flies and in particular the tsetse fly.

The scent or odour of lactic acid, octenol and the gas (typically carbon dioxide) released by the apparatus 10 is able to waft through the opening 36 into the atmosphere surrounding the trap 30. Of course the concentration of the scent is greatest within the housing 32. Thus, insects picking up the scent from outside the trap 30 may be lured into the housing 32.

Figure 6A:
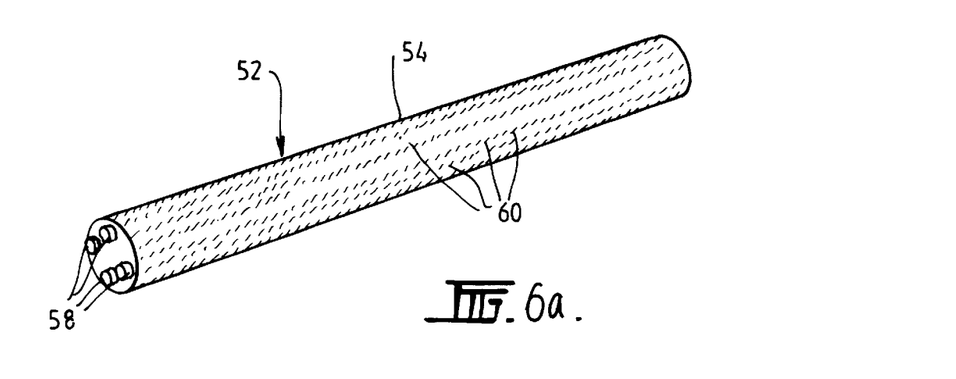
FIG. 6a is a perspective view of a light source incorporated in the insect eradication device.
Figure 6B:
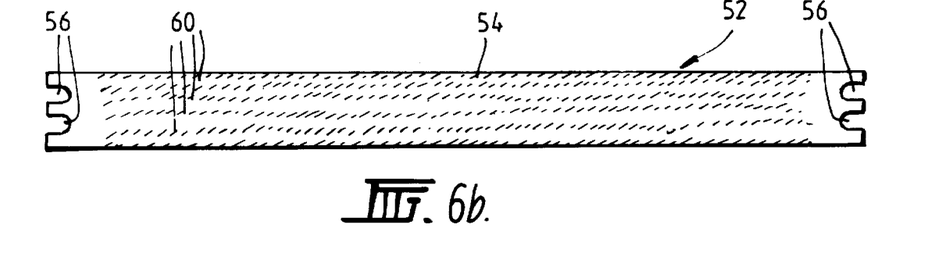

The trap 30 also includes a light source 48 for emitting light of wavelengths attractive to a particular insect or range of insects desired to be trapped. The light source 48 comprises a combination of an ultraviolet light 50 and a broad spectrum light 52. The ultraviolet light 50 can be in the form of a standard ultraviolet tube. The spectrum light 52 is a specially designed light for emitting a wide range of different wavelengths. One form of spectral light 52 is depicted in FIG. 6a and 6b. The spectrum light 52 comprises a light mixer in the form of a transparent or translucent prism 54 to which devices that emit light of different wavelength are optically coupled. This coupling is achieved by providing recesses 56 provided at opposite ends of the prism 54 into which the devices are fitted. These devices most typically would be in the form of LED's 58. In this embodiment, four LED's are mounted on each end of the prism 54 and ideally would comprise LED's of the three primary additive colours (red, green and blue) together with one LED for providing white light. Typically, the primary additive spectral colours of the LED's 58 would be red—640 nm; green—537 nm; and blue—464 nm. The light source 48 can be controlled to produce light of wavelengths in a range from around 350 nm (near ultraviolet) to around 660 nm. The outside surface of the prism 54 is provided with an array of grooves or scratches 60 to increase the refraction of light emitted by the spectral light 52. In addition, or as an alternative to the provision of the grooves/scratches 60, the outside surface of a prism 54 can be frosted.

Figure 7A:
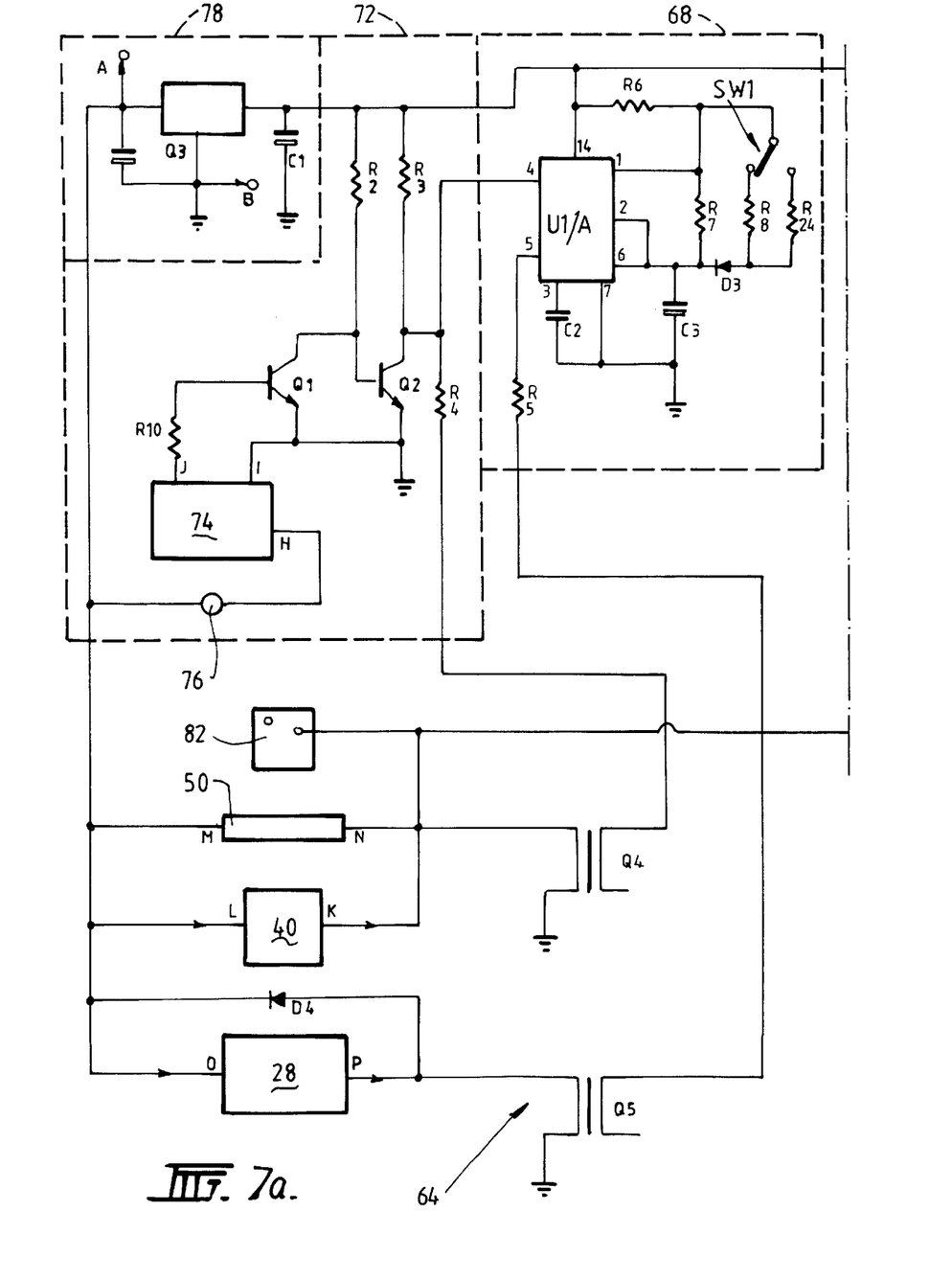
FIGS. 7a and b is a circuit diagram for controlling the insect eradication device.
Figure 7B:
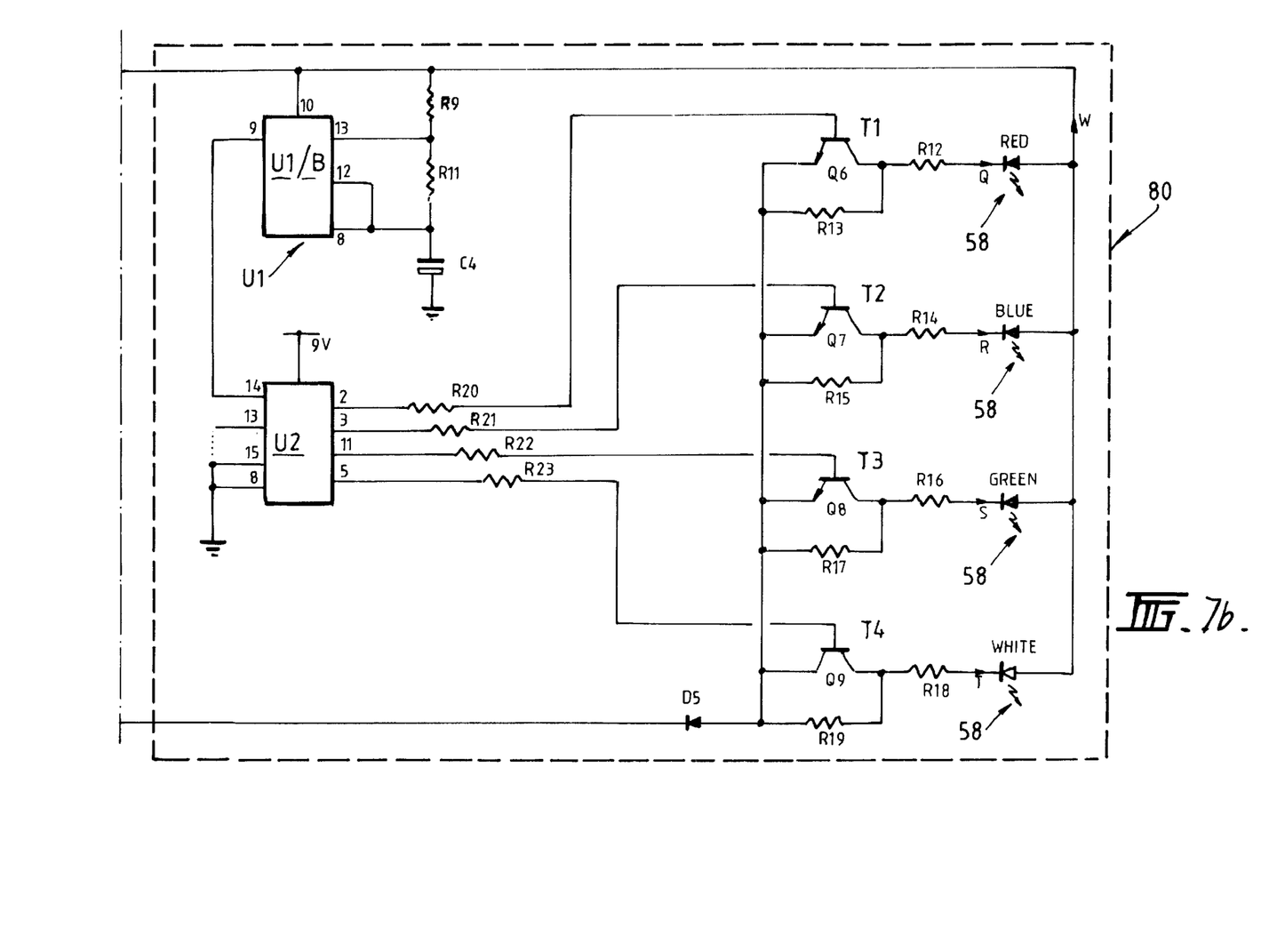
Figure 8:
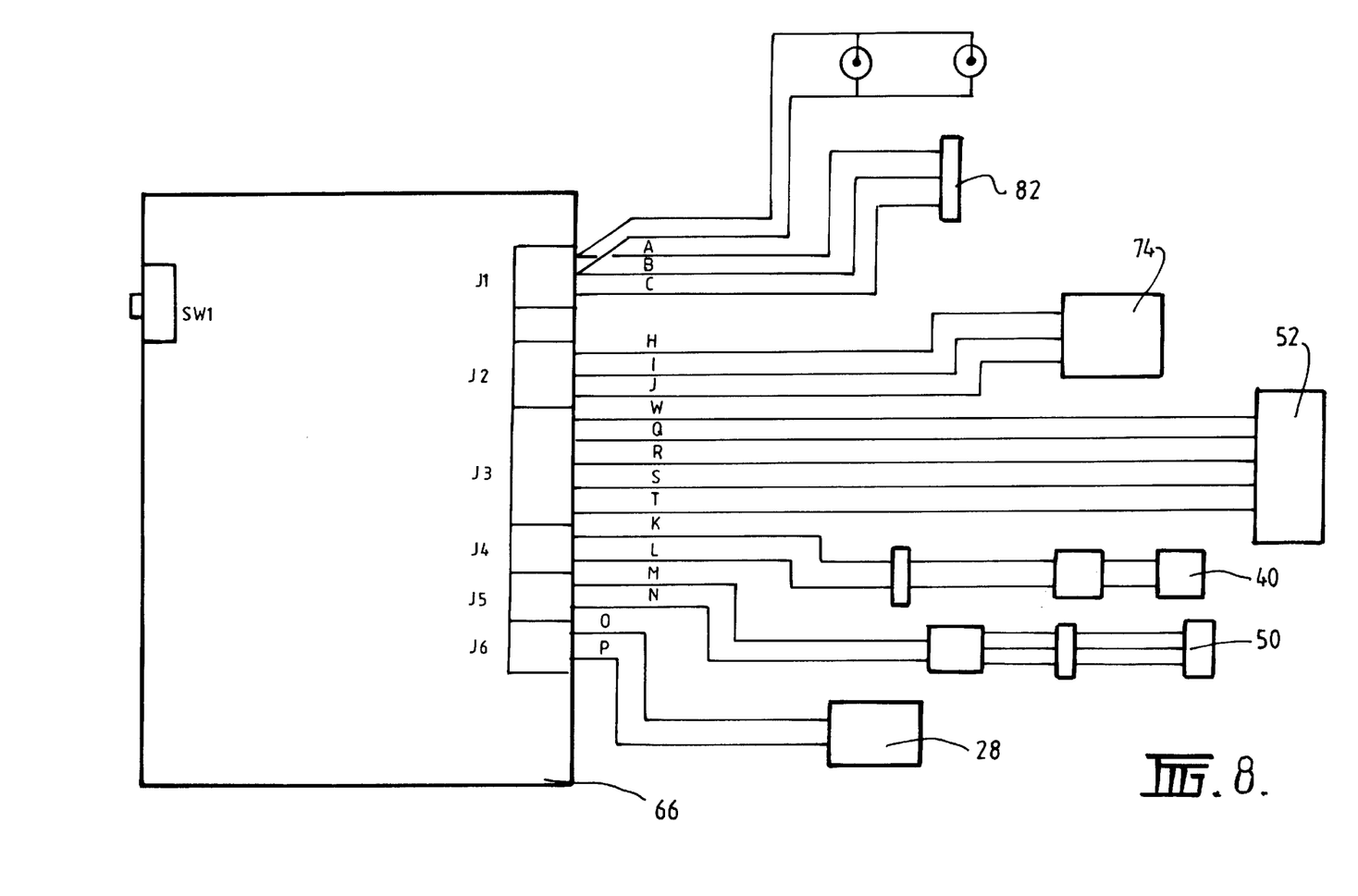
FIG. 8 depicts the electrical connection of components of the insect eradication device to the electronic circuit.

The circuitry for operating and controlling the trap 30 is held within an enclosure 62 retained within the housing 32. FIGS. 7 and 8 illustrate one embodiment of a circuit held within the enclosure 62. The circuit 64 depicted in FIG. 7 is mounted on a printed circuit board (PCB) 66 depicted in FIG. 8. FIG. 8 illustrates the connection of various components of the trap 30 to the circuit 64. The circuit 64 has several main blocks or sections. The valve timing and auxiliary control section 68 sets one or two predetermined duty cycles for pulsing the valve 28 to release gas held within a storage vessel into the apparatus 10. The duty cycle required can be selected by manipulation of switch SW1 which is accessible on a back panel 70 of the housing 32. The circuit section 68 also controls the fan 40 and UV light 50.

Another important section of the circuit 64 is the master control module 72 which includes a clock 74 for setting the ON/OFF operating time for the trap 30. The clock 74 also has controls accessible from the back panel 70 for setting the operational time of the trap 30. This can include operating the trap 30 continuously twenty-four hours a day. One or more sensors 76 can be placed in a control line H from the clock 74 to a power supply circuit 78 for providing a trigger to the operation of the valve timing and auxiliary control circuit 68. The sensors 76 can for example sense physical parameters such as temperature, light levels, air pressure or wind speed in the vicinity of the trap 30 for enabling the timing circuit 68. Thus while the master control circuit 72 and in particular the clock 74 can set the time period at which power is made available to the valve timing and auxiliary control circuit 68, the sensors 76 can, in that time period, control the provision of power to the circuit portion 68.

The circuit 64 further includes a spectrum light control block 80 for controlling the LED's 58. The circuit block 80 receives a regulated voltage via the power supply circuit 78 to provide for stable and consistent brightness of the LED's 58. Circuit 80 includes an astable oscillator U1 formed by a common 555 timer chip and provides clock pulses to pin 14 of chip U2 which is a 4022 counter. Chip U2 can be configured to provide four or eight outputs. In the present circuit, one of the LED's 58 is coupled to each second output and the chip U2 is configured to give a pause between colour changes, ie illumination of different LED's. Each time the counter U2 receives a clock pulse from oscillator U1, it switches on the next output in order, thus sequencing through all of its outputs cyclically. The frequency of the clock pulses is determined by U1 and can be set to any desired frequeny but typically for any particular application is fixed to one frequency. As each second output of the counter U2 switches on, it in turn switches on transistors T coupled to that output to fully illuminate an associated LED 58. The LED's do not, in this application, fully turn off, rather they are always partially illuminated. If desired, a capacitor can be coupled to the base of each transistor T to soften the visual transition from one colour to another as sequential LED's are switched between a partially illuminated state and the fully illuminated state.

Figures 9, 10:
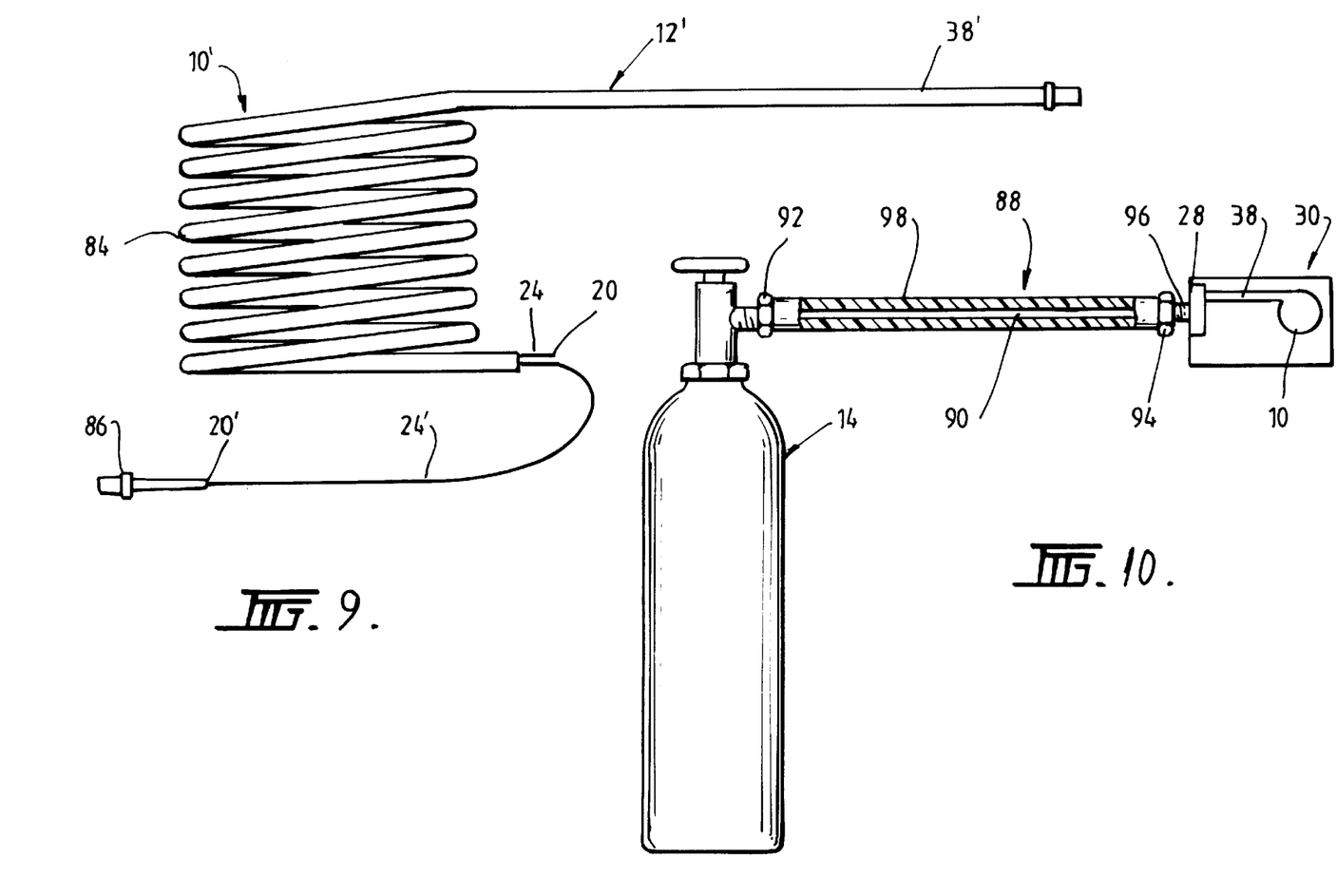
FIG. 9 is an embodiment of an alternate form of the apparatus for the continuous slow release of the compressed gas.
FIG. 10 depicts a coupling for coupling the insect eradication device to a bottle of compressed gas.

A slave socket 82 is provided in the circuit 64 to enable to control a fan and light source of a slave trap (not shown). The slave trap would be located remotely from the trap 30 and would include only a fan, light source and solution tray. All control over the slave unit would be via the electronic circuit 64 held within the housing 32 of the trap 30. A slow gas release is provided to the slave unit by modifying the apparatus 10 to include a second restrictor tube that couples into the slave unit. An example of a modified slow gas release apparatus 10' (referred to as the "twin slow release chamber 10') is depicted in FIG. 9. Here, the pressure vessel 12' is in the form of a copper pipe formed with a straight length 38' (that would be connected to valve 28) and a coiled section 84. Inside the coil 84 are two separate lengths of restrictor tube similar to restrictor tube 16 depicted in FIG. 1. One of the restrictor tubes has a length 24 extending from the copper tubing 12' and terminating in the opening 20 that is disposed within the housing 32 of trap 30. The second restrictor tube has a length 24' that extends to a slave trap (not shown) to provide a slow release of gas to the slave trap. Opening 20' of the length 24' is attached to a coupling 86 to allow connection with the housing of the slave unit. When the twin slow release chamber 10' is used, the duty cycle of the valve 28 is arranged first to stay on for a greater period of time (for example instead of staying open for one tenth of a second every thirty seconds perhaps it may stay open around 0.18 seconds every thirty seconds so that approximately 220 grams of gas per hour is continuously released by the twin chamber 10'). The switch SW1 shown in FIG. 8 can be moved between different positions to regulate the gas bleed depending on whether or not a slave trap and an associated twin slow release chamber 10' is used.

To provide gas to the trap 30 and in particular the apparatus 10, typically a bottle 14 of compressed gas would be connected to the valve 28. One way of doing this would be to use a conventional high pressure hose. However, such hoses are relatively expensive. FIG. 10 illustrates, a new hose 88 for this purpose comprising a metallic (typically copper) restrictor tube 90 having connector nut 92 at one end for connecting to the bottle 14 compressed gas and a nut 94 at the other end for connecting to a coupling 96 extending from the valve 28. The tube 90 is covered by a rubber hose 98 or similar casing to protect it and prevent it from being bent at a sharp angle. By use of this hose 88, there would be no need to incorporate a pressure regulator between the gas bottle 14 and the valve 28.

The operation of the trap 30 will now be described.

A solution typically incorporating lactic acid and octenol is placed in the solution tray 44 and then slid into the housing 32. Next, the clock 74 is adjusted via the back panel 70 to set the time of operation of the trap 30. For example, the clock 74 may be set to operate the trap 30 between 6:00 pm and 6:00 am everyday. (Although as explained above, the clock can be set to run the trap 30 twenty-four hours a day.) Next the switch SW1 can be moved between two positions to set the duty time for the operation of valve 28 to allow recharging of the pressure vessel 12 as compressed gas from a gas supply connected with the valve 28. Typically, on initial activation of the trap 30, the valve 28 will be operated for a predetermined time set by the switch SW1 to charge the pressure vessel 12 with a volume of compressed gas from the bottle 14 connected by hose 88. The fan 40 will also be operated as well the light source 48 during the ON time provided by the clock 74 and master control circuit 72. Compressed gas is slowly released into the chamber 34 via open end 20 of the restrictor tube 16 held within the pressure vessel 12. The released gas is circulated through the housing 32 by action of the fan 40. The circulating gas together with scent from the solution held within the tray 44 is able to waft to the surrounding atmosphere through the opening 36. The scent of the liquid held within the tray 44 together with the scent of the gas, attracts insects to the trap 30. Additionally, the light source 48 operates to radiate light at a plurality of different wave lengths to further act as a visual stimulus and attractant to the insects. Insects entering the chamber 34 may by virtue of attraction of the solution in the tray 44 fly or crawl into the solution and thus become trapped. Alternately, the down draught provided by the circulating air 42 can drive the insects into the solution in tray 44 again acting to entrap the insects. The gas released into the chamber 34 acts to asphyxiate the insects.

One or more slave units or traps can be coupled to the trap 30 via the slave socket 82 to provide a wider area of operation.

Now that embodiments of the present invention have been described in detail, it will be apparent to those skilled in the relevant arts that numerous modifications and variations may be made without departing from the basic inventive concepts. For example, the pressure vessel 12 can be made of any particular shape and configuration. Similarly, the restrictor tube 16 can be wound to any desired configuration within the pressure vessel 12. Also, the diameter of the restrictor tube 16 can be different for the coiled length 22 and the straight length 24.

In relation to the insect trap 30, the provision of liquid within the tray 44 is not essential. Initial experiments have found that embodiments of the trap 30 without the inclusion of a liquid in the tray 44 are nonetheless effective for attracting and asphyxiating insects. The liquid in tray 44 assists in positively entrapping and killing insects and also, as described above, allows for the inclusion of chemicals that can act to further attract the insects. It is also possible for the length 24 of restrictor tube 16 outside of the pressure vessel 12 to be directed so as to release gas into the liquid held within tray 44. This may have the added benefits of assisting in releasing attractive scents from the liquid into the atmosphere and also in reducing the surface tension of the liquid within the tray 44.

All such modifications and variations together with others that would be obvious to a person of ordinary skill in the art are deemed to be within the scope of the present invention, the nature of which is to be determined from the above description and the appended claims.

What is claimed is:

1. An apparatus for providing a continuous slow release of a compressed gas, the apparatus comprising at least:
   a pressure vessel having a gas inlet adapted for connection to a supply of compressed gas;
   a restrictor tube having a first length provided with a first open end each located within the pressure vessel and a second length provided with a second open end each located outside the pressure vessel, the restrictor tube being configured such that when the supply of compressed gas is connected to the pressure vessel by the gas inlet so that a volume of gas is transferred from the supply of compressed gas to the pressure vessel, the volume of gas enters the first open end of the restrictor tube, travels through the first and second lengths of the restrictor tube and exists from the second open end of the restrictor tube to provide a continuous slow release of the volume of gas from the pressure vessel; and
   means for opening, from time to time, a fluid communication path between the supply of compressed gas and the pressure vessel to charge the pressure vessel with said volume of compressed gas.

2. The apparatus of claim 1 wherein said means is automatically operated to cyclically open the communication path for a predetermined first period after the expiration of a predetermined second period.

3. The apparatus of claim 1 wherein said means is automatically operated to open said communication path for a predetermined first period upon detecting a predetermined physical characteristic of, the gas inside the pressure vessel and/or the surrounding environment.

4. The apparatus of claim 3 wherein predetermined physical characteristic may include one or more of the following: gas pressure inside the pressure vessel; gas pressure inside the restrictor tube; gas temperature within the pressure vessel; gas temperature within the restrictor tube; a predetermined difference in gas pressure or temperature within the pressure vessel and a predetermined location within the restrictor tube; ambient light; pressure, temperature, wind speed.

5. An insect trap comprising at least:
   (a) a housing having an insect collection chamber and one or more apertures to allow an insect to enter the chamber;
   (b) a pressure vessel having a gas inlet adapted for connection to a supply of compressed gas; and
   (c) a restrictor tube having a first open end located within the pressure vessel and an opposite second open end located within the insect collection chamber so that the gas is continuously and slowly released into the chamber, whereby, in use, an insect, upon entering the chamber through said aperture, is asphyxiated by the gas and collects in the chamber.

6. The trap according to claim 5 further including a light source for producing a light of a wavelength attractive to a range of insects desired to be trapped.

7. The trap according to claim 6 further including a body of liquid held in the chamber at a location so that an asphyxiated insect can fall into the liquid.

8. The trap according to claim 7 wherein the liquid includes a volume of lactic acid.

9. The trap accordingly to claim 8 wherein the liquid further includes a volume of octenol.

10. The trap according to claim 7 further including air circulation means for circulating air through said housing in a direction to produce a down draught near said opening toward said body of liquid.

11. The trap according to claim 6 wherein said light source includes at least two light emitting devices emitting light of different wavelength.

12. The trap according to claim 11 further including a light source circuit for controlling the ON/OFF cycle of the light emitting devices.

13. The trap according claim 11 wherein said light source includes a light mixer for mixing the light emitted by said light emitting devices.

14. The trap according to claim 13 wherein said light mixer includes a transparent or translucent prism to which said light emitting devices are optically coupled.

15. The trap according to claim 14 wherein said prism is provided with an array of surface grooves or scratches for refracting light emitted by said light emitting devices as it passes from the prism to the surrounding atmosphere.

16. The trap according to claim 15 wherein the surface of the prism is frosted.

17. An insect trap as recited in claims 5, wherein the restrictor tube has a first length provided with the first open end, the first length being disposed within the pressure vessel.

18. An insect trap as recited in claim 17, wherein at least a portion of the first length is bent.

19. An insect trap as recited in claim 5, wherein at least a portion of the pressure vessel is disposed within the housing.

20. An apparatus for providing a continuous slow release of a compressed gas, the apparatus comprising:
 (a) a pressure vessel bounding a chamber, the pressure vessel having a gas inlet adapted for connection to a supply of compressed gas; and
 (b) a restrictor tube having:
  (i) a first length provided with a first open end, the first length and first open end being disposed within the chamber of the pressure vessel such that the first open end is in fluid communication with the chamber, the first length of the restrictor tube being bent within the chamber; and
  (ii) a second length provided with a second open end, the second length and second open end being disposed outside of the pressure vessel.

21. An apparatus as recited in claim 20, wherein the first length of the restrictor tube being bent within the chamber comprises the first length of the restrictor tube being at least partially coiled within the chamber.

22. An apparatus as recited in claim 20, wherein the chamber has an elongated length, the first length of the restrictor tube having a linear length greater than the elongated length of the chamber.

23. An apparatus as recited in claim 20, wherein the restrictor tube is a discrete element from the pressure vessel.

24. An apparatus as recited in claim 20, wherein the first length of the restrictor tube is integrally formed with the second length.

25. An apparatus for providing a continuous slow release of a compressed gas, the apparatus comprising:
 (a) a pressure vessel bounding a chamber having an elongated length, the pressure vessel having a gas inlet adapted for connection to a supply of compressed gas; and
 (b) a restrictor tube having:
  (i) a first length provided with a first open end, the first length and first open end being disposed within the chamber of the pressure vessel such that the first open end is in fluid communication with the chamber, the first length of the restrictor tube having a linear length greater than the elongated length of the chamber; and
  (ii) a second length provided with a second open end, the second length and second open end being disposed outside of the pressure vessel.

* * * * *

UNITED STATES PATENT AND TRADEMARK OFFICE
CERTIFICATE OF CORRECTION

PATENT NO.     : 6,199,316 B1
DATED          : March 13, 2001
INVENTOR(S)    : Andrew Paul Coventry It is certified that error appears in the above-identified patent and that said Letters Patent is hereby corrected as shown below:

<u>Title page,</u>
Item [54], please change "INCORPORATING SAME" to -- INCORPORATING THE SAME --

<u>Column 2,</u>
Line 3, please change "slowing" to -- slowly --

<u>Column 3,</u>
Line 27, please change "ie minimising" to -- i.e. minimizing --
Line 30, please change "take" to -- taken --
Line 50, please change "being continuously and slowing" to -- being a continuous and slow --
Line 54, please change "ie time" to -- i.e. time --
Line 55, please change "pulses can" to -- pulses, can --
Line 67, please change "18,20" to -- 18, 20 --

<u>Column 5,</u>
Line 59, please change "an astable" to -- a stable --
Line 65, please change "ie illumination" to -- i.e. illumination --

<u>Column 6,</u>
Line 64, please change "6:00 pm" to -- 6:00 p.m. --
Line 65, please change "6:00 am" to -- 6:00 a.m. --

UNITED STATES PATENT AND TRADEMARK OFFICE
CERTIFICATE OF CORRECTION

PATENT NO. : 6,199,316 B1
DATED : March 13, 2001
INVENTOR(S) : Andrew Paul Coventry It is certified that error appears in the above-identified patent and that said Letters Patent is hereby corrected as shown below:

Column 7,
Line 14, please change "scent from" to -- the scent from --

Signed and Sealed this

Fourteenth Day of January, 2003

JAMES E. ROGAN
*Director of the United States Patent and Trademark Office*